UNITED STATES PATENT OFFICE.

SHIRLEY L. AMES, OF EVERETT, MASSACHUSETTS.

FLAVORING EMULSION.

1,097,607.　　　　　Specification of Letters Patent.　　Patented May 26, 1914.

No Drawing.　　　Application filed June 2, 1913. Serial No. 771,262.

*To all whom it may concern:*

Be it known that I, SHIRLEY L. AMES, a citizen of the United States, residing at Everett, county of Middlesex, State of Massachusetts, have invented an Improvement in Flavoring Emulsions, of which the following is a specification.

This invention relates to the production of a concrete flavoring product made from citrus fruits and the object of the invention is to produce a flavoring product of this nature which possesses a flavor and aroma more nearly resembling that of the fresh fruit than can be obtained by other processes known to me.

The fresh peel of citrus fruits contains not only the essential oils but also some acid, neutral resins and aldehydes. Various processes have heretofore been used for extracting the essential oils from the fresh peel of citrus fruits such as lemons, oranges, etc., but such processes produce an oil which is comparatively free from the acid, neutral resins and aldehydes contained in the peel. It has also been proposed to extract the resins and aldehydes by means of a solvent but this is open to some objections in that the product produced is of inferior quality.

In producing my improved flavoring product I employ a process by which not only the essential oils but also certain resins and aldehydes contained in the peel will be extracted therefrom and will be compounded in what I have termed a "natural emulsion." The presence of these resins and aldehydes in the product is advantageous in that they supplement and modify the flavoring power of the essential oils and produce a product having a flavor and aroma which more nearly resembles that of the fresh fruit than flavoring products produced by other processes.

The process is as follows: The hard exterior part of the peel is removed from the fruit either with hand knives or by means of machines. It is then preferably while still fresh ground in a machine which will grind and compress it at the same time allowing the liquid to run off into one container while the solid peel falls into another. This machine must be such that the oil vesicles will be broken and the peel compressed practically at the same time. I have found it convenient to use an ordinary meat grinder in which the screw fits rather tightly in the casing for this purpose and in which small holes are provided so that the fluid may escape as it is pressed out of the skins.

It is essential that the liquid should be allowed to escape at the time that the peel is ground and pressed for I have found that if the peel is ground and the liquid is allowed to remain in the ground peel leaving it to be separated later by a press an entirely different product will result.

The liquid produced by this process contains about 65 per cent. of water, about 10 per cent. oil of lemon or other fruit and about 25 per cent. of finely ground peel, aldehydes and resins. The finely ground peel performs an important function of holding the aldehydes and resins in suspension. The aldehydes are more or less volatile and the solid portions of the peel hold them in suspension in the liquid. The resins are semi-solid and are also retained by the finely ground peel in a more or less mechanical manner. This liquid is then separated to remove a certain portion of the water. This may be done in any manner desired but I prefer to add salt preferably from 10 to 30 per cent. of the weight of the liquid. When I wish to have considerable salt in the finished product to act as a preservative I add more, sometimes even more that 50%. The salt dissolves in the water but not in the oil and therefore, increases the specific gravity of the water. As the liquid is allowed to stand for a few hours the greater portion of the water will settle and may be drawn off. A centrifugal machine may be used to separate the water or the salt water if salt is used, but I prefer the first described method as the product is better if manipulated as little as possible. A preservative such as glycerin may be added if desired to increase the keeping qualities. In this manner I produce a "natural emulsion" which contains a large proportion of oil, the essential of the fruit, a greater proportion of fruit peel, aldehydes and resins with more or less water. The product may also contain more or less salt sometimes as much as 40% which acts as a preservative and is not objectionable because the product is so strong in its flavoring properties that a very small proportion need be used to give the desired flavor. For example, an ounce or two of the product is sufficient to flavor one hundred pounds of candy and as will be readily seen the amount of salt would be inappreciable for most purposes.

Having described my invention, what I claim as new and desire to secure by Letters Patent is:—

1. The process of extracting a flavoring compound from the peel of citrus fruits which consists in simultaneously grinding and pressing the peel, collecting the escaping liquid with finely ground portions of the peel and separating the water.

2. The process of extracting a flavoring compound from the peel of citrus fruits which consists in simultaneously grinding and pressing the peel, collecting the liquid as it escapes, with finely ground portions of the peel, adding salt and separating a portion of the salt water therefrom.

3. A product obtained from the peel of citrus fruits comprising the oil of the fruit, finely ground portions of the peel, the natural aldehydes and resins, the resins and aldehydes being sustained in the liquid by means of the finely ground peel.

4. A product obtained from the peel of citrus fruits comprising essential oil of the fruit, finely ground portions of the peel, and resins held in suspension by the said finely ground portions of the peel.

5. A product obtained from the peel of citrus fruits comprising essential oil of the fruit, finely ground portions of the peel, and natural resins mechanically held in suspension by the finely ground portions of the peel.

6. A product obtained from the peel of citrus fruits comprising essential oil of the fruit, finely ground portions of the peel, resins held in suspension by said finely ground portions of the peel and salt.

7. A product obtained from the peel of citrus fruits comprising essential oil of the fruit, finely ground portions of the peel and a preservative.

In testimony whereof, I have signed my name to this specification, in the presence of two subscribing witnesses.

SHIRLEY L. AMES.

Witnesses:
   Louis C. Smith,
   Charlotte S. Taylor.